US010757790B2

(12) United States Patent
Bhide et al.

(10) Patent No.: US 10,757,790 B2
(45) Date of Patent: Aug. 25, 2020

(54) SENSOR HUB APPARATUS AND METHOD FOR SENSING AMBIENT LIGHT AND AUDIO CONDITIONS

(71) Applicant: Intel Corporation, Santa Clara, CA (US)

(72) Inventors: Sandhiprakash J. Bhide, Beaverton, OR (US); Sheldon L. Sun, Portland, OR (US); James Bigler, Beaverton, OR (US); Christopher T. Sauvageau, Forest Grove, OR (US); Henry Bruce, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 837 days.

(21) Appl. No.: 15/179,867

(22) Filed: Jun. 10, 2016

(65) Prior Publication Data

US 2017/0359664 A1    Dec. 14, 2017

(51) Int. Cl.
*G06F 17/00* (2019.01)
*H05B 47/12* (2020.01)
(Continued)

(52) U.S. Cl.
CPC ............. *H05B 47/12* (2020.01); *H04R 1/028* (2013.01); *H05B 47/105* (2020.01); *H05B 47/11* (2020.01);
(Continued)

(58) Field of Classification Search
CPC ............ H05B 33/0854; H05B 33/0872; H05B 37/0227; H05B 37/0236; F21V 23/0442; F21V 23/0471; H04R 1/028; Y02B 20/46
See application file for complete search history.

(56) References Cited

U.S. PATENT DOCUMENTS 5,063,833 A   11/1991  Hara et al.
6,459,919 B1  10/2002  Lys et al.
(Continued)

FOREIGN PATENT DOCUMENTS

EP        1643324 A2     4/2006
KR    10-2014-0010237 A  1/2014
WO     2014-124159 A2    8/2014

OTHER PUBLICATIONS

U.S. Appl. No. 14/962,669, entitled "Intelligent LED Bulb and Vent Method, Apparatus and System," filed Dec. 8, 2015.
(Continued)

*Primary Examiner* — Thomas H Maung
(74) *Attorney, Agent, or Firm* — Schwabe, Williamson & Wyatt, P.C.

(57) ABSTRACT

Apparatuses, methods and a storage medium associated with a sensor hub are disclosed herein. In embodiments, a sensor hub may include a body with a plurality of apertures disposed on the sensor hub body at substantially equal distances to each other, oriented towards a plurality of directions, and a plurality of sensors disposed inside the sensor hub body to interface respective apertures, to sense ambient conditions in the plurality of directions via the apertures. The sensor hub may further include one or more communication interfaces to transmit the sensor data or results from processing the sensor data to an external recipient. Other embodiments may be described and claimed.

9 Claims, 12 Drawing Sheets

(51) Int. Cl.
   *H04R 1/02*    (2006.01)
   *H05B 47/11*   (2020.01)
   *H05B 47/105*  (2020.01)
   *H04R 1/04*    (2006.01)

(52) U.S. Cl.
   CPC ............ *H04R 1/04* (2013.01); *H04R 2430/01* (2013.01); *Y02B 20/46* (2013.01)

(56) References Cited

U.S. PATENT DOCUMENTS

| | | | |
|---|---|---|---|
| 8,639,391 | B1 | 1/2014 | Alberth, Jr. et al. |
| 9,143,232 | B2 | 9/2015 | Bhide |
| 2005/0125102 | A1 | 6/2005 | Nichols et al. |
| 2006/0285325 | A1 | 12/2006 | Ducharme et al. |
| 2008/0001551 | A1 | 1/2008 | Abbondanzio et al. |
| 2008/0015740 | A1 | 1/2008 | Osann, Jr. |
| 2009/0009317 | A1* | 1/2009 | Weaver ................ G06Q 10/06 340/517 |
| 2010/0141153 | A1 | 6/2010 | Recker et al. |
| 2012/0046792 | A1 | 2/2012 | Secor |
| 2012/0154521 | A1* | 6/2012 | Townsend .......... H04N 5/23238 348/36 |
| 2012/0302219 | A1 | 11/2012 | Vang |
| 2013/0063042 | A1 | 3/2013 | Bora et al. |
| 2014/0207721 | A1* | 7/2014 | Filson ................ H04L 12/1895 706/46 |
| 2014/0252958 | A1 | 9/2014 | Subotnick et al. |
| 2015/0097683 | A1* | 4/2015 | Sloo .......................... F24F 11/30 340/628 |
| 2016/0286619 | A1* | 9/2016 | Roberts .............. H05B 33/0854 |
| 2017/0118458 | A1* | 4/2017 | Gronholm ............ H04N 13/156 |
| 2017/0187956 | A1* | 6/2017 | Fink ................... H04N 5/23206 |

OTHER PUBLICATIONS

U.S. Appl. No. 14/962,662, entitled "Sensor Hub Method and Apparatus for an Electrical Outlet," filed Dec. 8, 2015.
Non-Final Office Action dated Jun. 17, 2016, issued in related U.S. Appl. No. 14/962,669, filed Dec. 8, 2015.
International Search Report and Written Opinion dated May 3, 2016 for International Application No. PCT/US2016/014133, 17 pages.
International Search Report and Written Opinion dated May 12, 2016 for International Application No. PCT/US2016/014137, 18 pages.

\* cited by examiner

SENSOR HUB APPARATUS AND METHOD FOR SENSING AMBIENT LIGHT AND AUDIO CONDITIONS

TECHNICAL FIELD

The present disclosure relates to the field of sensing technology, and in particular, to apparatuses, methods and a storage medium associated with a sensor hub for sensing light and audio conditions.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Ambient light sensors or ambient sound sensors have separately found a wide use in the home or industrial environment. Certain ambient light or sound sensors may be provided to respectively control lighting or audio in a zone of a home environment, in which light or audio in each zone may be controlled independently. A zone may be defined as multiple lighting or audio units controlled by one ambient light or audio sensor. That is, prior art mechanisms are typically limited to the same type of sensors, and may typically be used in a uni-dimensional zone controlled application.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and a storage medium associated with a sensor hub are disclosed herein. In embodiments, a sensor hub may include a body of the sensor hub. The sensor hub body may include a plurality of apertures disposed on the sensor hub body at substantially equal distances to each other, oriented towards a plurality of directions, and a plurality of ambient light and sound sensors disposed inside the sensor hub body to interface respective apertures, to sense ambient light and audio conditions via respective apertures. The sensor hub may further include one or more communication interfaces, to transmit the sensor data or results from processing the sensor data to an external recipient. In embodiments, the sensor hub may further include a processor coupling the plurality of sensors to the one or more communication interfaces, disposed inside the sensor hub body, to receive and process the sensor data, with the one or more communication interfaces to transmit results of the processing to the external recipient.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other.

Figure 1:
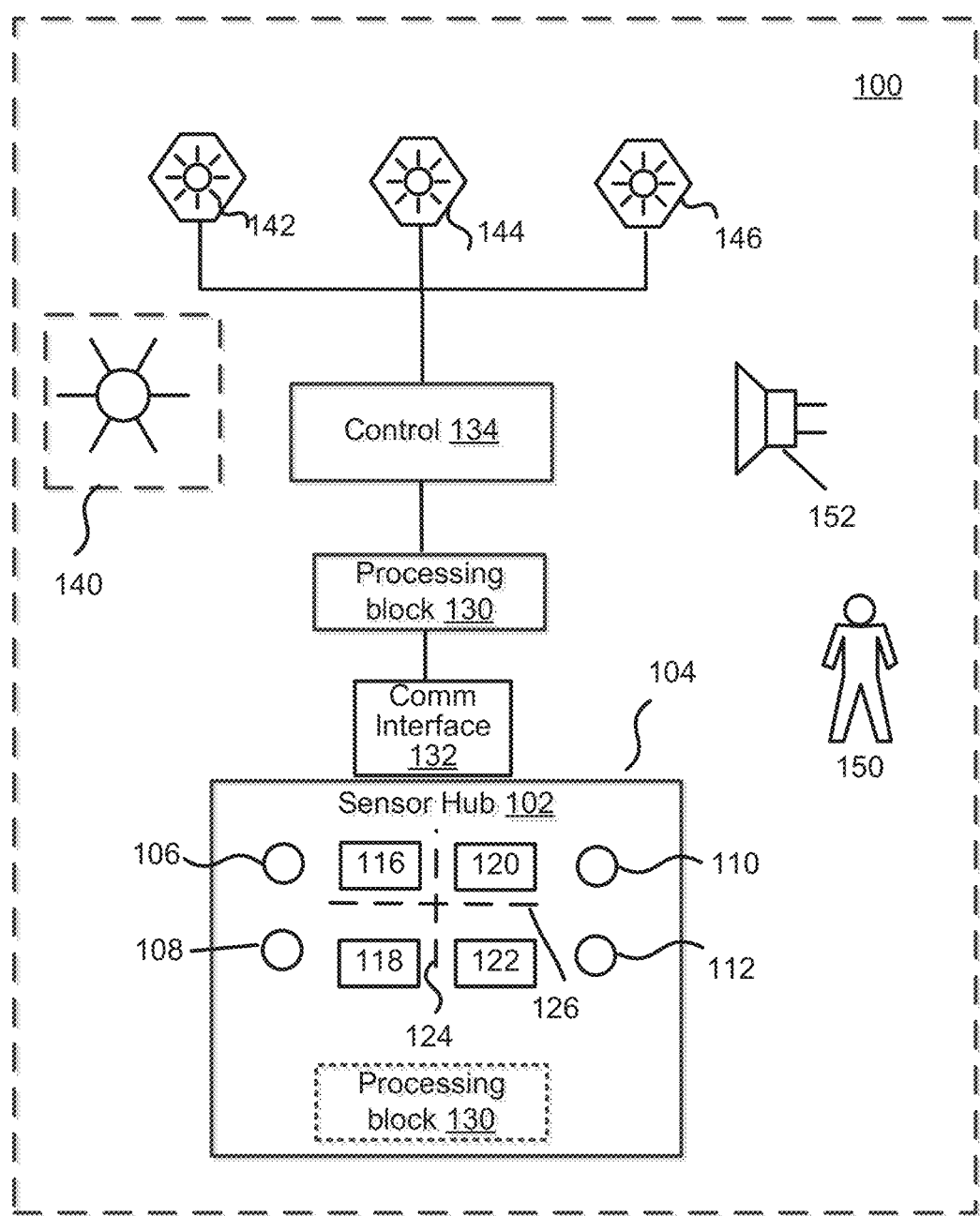
FIG. 1 is a block diagram of an example sensor hub disposed in an environment to provide integral sensing of at least ambient light and sound conditions, in accordance with some embodiments.

FIG. 1 is a block diagram of an example sensor hub disposed in an environment to provide integrated and simultaneous sensing of at least ambient light and sound conditions in an environment, in accordance with some embodiments. The sensor hub 102 may be disposed in an environment 100, such as a room or other area of a home.

The sensor hub 102 may include a body 104. The sensor hub body 104 may include a plurality of apertures, e.g., at least four apertures 106, 108, 110, 112, disposed on the sensor hub body 104 in a coordinated manner, e.g., at substantially equal distances to each other. The sensor hub 102 may further include a plurality of sensors, e.g., at least four sensors 116, 118, 120, 122, disposed inside the sensor hub body 104 to interface with respective apertures, to integrally and simultaneously sense at least ambient light and sound conditions of the environment 100 via the apertures. In some embodiments, the sensors 116, 118, 120, 122 may be symmetrically disposed, e.g., substantially orthogonally to each other in four quadrants, as schematically indicated by dashed lines 124, 126.

The above-noted relative disposition of sensors inside the sensor hub body may provide for synchronized capturing of ambient conditions (e.g., light, noise, and the like) from multiple directions, and controlling the ambient conditions based on the captured ambient information. The term "synchronized" is used herein to indicate that the start/end of the collection of ambient conditions data may occur within a precision of less than user specified time (e.g., seconds) between sensors of the sensor hub 102 or between multiple sensor hubs that may be present in the environment 100. Each of the sensors (or sensor hubs) may capture a luminosity value of the scene or decibel value of the ambient sound within the user specified time instant, which may be essential to enable many applications, such as controlling ambient lighting of a room, identifying the position of the sensor hub, determining the robustness of the sensors or identifying a direction from which a sound may come.

The sensor hub 102 may further include, or couple with, a processing block 130. In some embodiments, the processing block 130 may be disposed with the sensor hub body 104 (shown in dashed lines), and coupled to the sensors 116, 118, 120, 122 to receive and process sensor data from the sensors, and further coupled to one or more communication interfaces 132, to transmit the sensor data or results from processing of the sensor data to an external recipient, such as a control block 134. In some embodiments, the processing block 130 may be externally disposed, and coupled with the sensor hub 102 via the communication interfaces 132 (as shown).

In embodiments, the sensor hub 102 may be configured to identify light and audio conditions in the environment 100 based on the received sensor data. The light conditions may be formed, for example, by a combination of light sources, such as by a natural light source, e.g., a window 140 in a room comprising the environment 100, and/or one or more (e.g., multiple) external (artificial) light sources 142, 144, 146 disposed in the environment 100. The sensor hub 102 may cause the external light sources (e.g., via control block 134 coupled with the light sources 142, 144, 146) to adjust light intensity, based at least in part on the identified light conditions.

In embodiments, the sensor hub 102 may be configured to identify sound conditions (noise, audio, sounds) of the environment 100 based on the received sensor data. The noise may come from different sources, including people in the room (e.g., one or more persons 150), and/or artificial sound sources, such as a speaker 152.

In embodiments, the sensor hub 102 may be configured to identify noise conditions in the environment 100 based on the received sensor data and adjust or cause to be adjusted the sound level of the artificial sound sources (e.g., 152) based at least in part on the identified noise conditions. In some embodiments, the sensor hub 102 may be further configured to adjust (or cause to be adjusted) light intensity based in part on the identified light conditions and noise conditions.

In embodiments, the sensors 116, 118, 120, 122 may comprise ambient light sensors (ALS), ultra violet (UV) light sensors, or ambient sound sensors (ASS). In general, the light may mean visible light, infrared, UV light, or any other electromagnetic radiation from the spectrum and the corresponding sensor means any sensors that sense that kind of radiation. In embodiments the sensors 116, 118, 120, 122 may comprise a combination of ALS and ASS, wherein there may be at least four ALS and at least four ASS disposed in the sensor hub 102. The sensors of the sensor hub 102 may further include other different types of sensors, such as passive infrared (PIR) sensors, temperature sensors, energy sensors, or other types of sensors to detect and capture ambient conditions.

In summary, the sensor hub 102 may have the ability to process sensor data directly at the sensor hub, when the end sensor node (e.g., processing block 130) is disposed on a computing board (e.g., printed circuit board (PCB)). In some embodiments, the sensor hub 102 may have the ability to process sensor data at the computing board connected to the sensor hub 102 by a communication interface (e.g., 132), such as universal serial bus (USB), or may pass data to gateway devices (e.g., control block 134) located in the environment 100 or outside or to a back end processor in the cloud.

Figure 2:
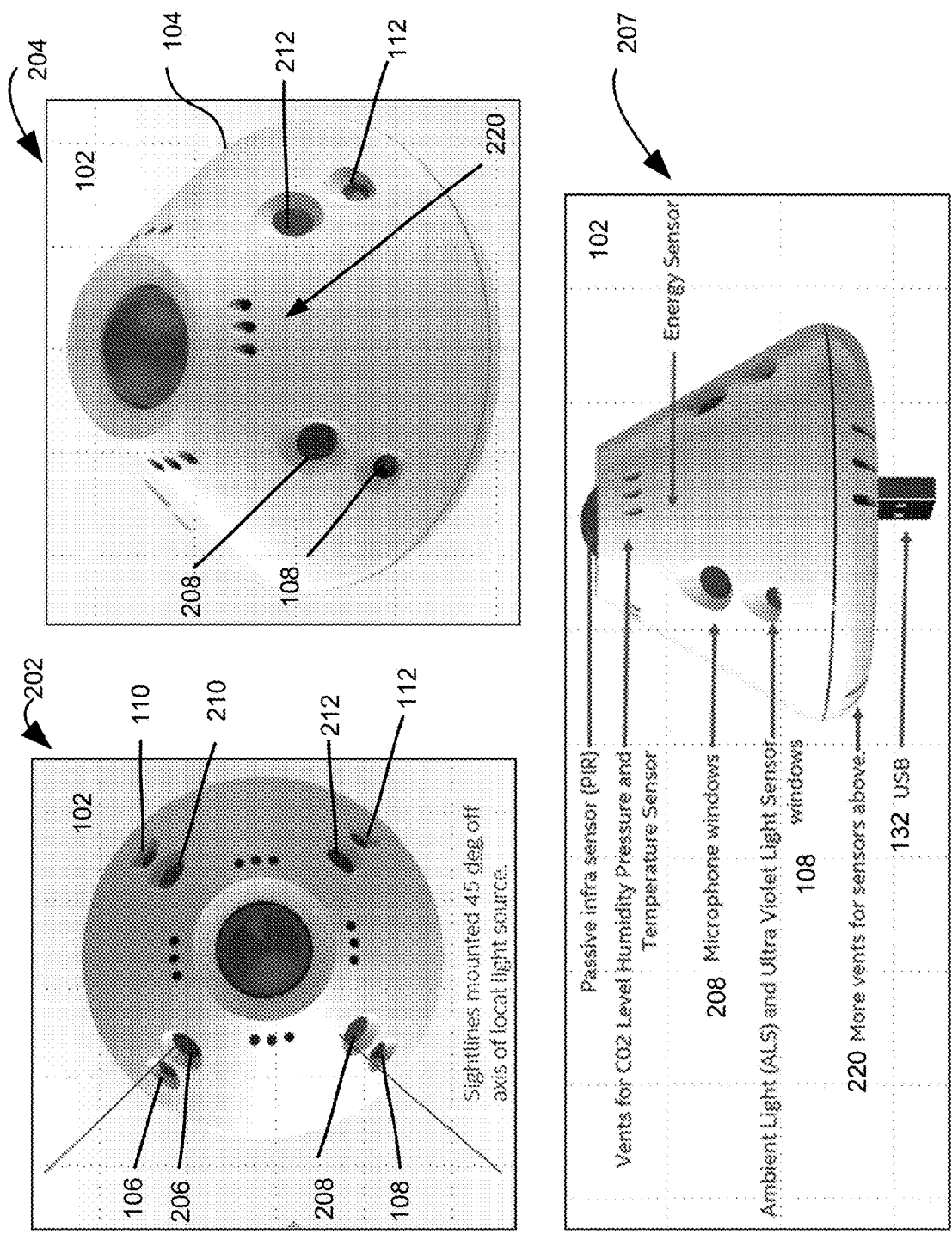
FIG. 2 illustrates different views of an example sensor hub, in accordance with some embodiments.

FIG. 2 illustrates different views of an example sensor hub, in accordance with some embodiments. Specifically, view 202 is a top view of the sensor hub 102, view 204 is a perspective view of the sensor hub 102, and view 207 is a side view of the sensor hub 102. For ease of understanding, like components of FIG. 1 and the figures described below are denoted by like numerals.

As shown, the sensor hub body 104 may include apertures (ALS and ultra violet light sensor windows) 106, 108, 110, 112 disposed at the same distances (and in this example substantially orthogonally) to each other, to interface with the ALS disposed inside the sensor hub body 104 (not shown). The sensor hub body 104 may further include apertures 206, 208, 210, 212 (microphone windows) disposed in substantially the same manner as apertures 106, 108, 110, 112, e.g., at same relative distances from each other (and in this example substantially orthogonal to each other), to interface respective ASS disposed inside the sensor hub body 104 (not shown). In addition, the sensor hub body 104 may include multiple vents 220, to provide further entries for ambient conditions, such as light or sound, and to interface other types of sensors (e.g., temperature sensors, humidity sensors, pressure sensors, carbon monoxide (CO) level sensors, or the like) that may be disposed in the sensor hub 102.

Figure 3:
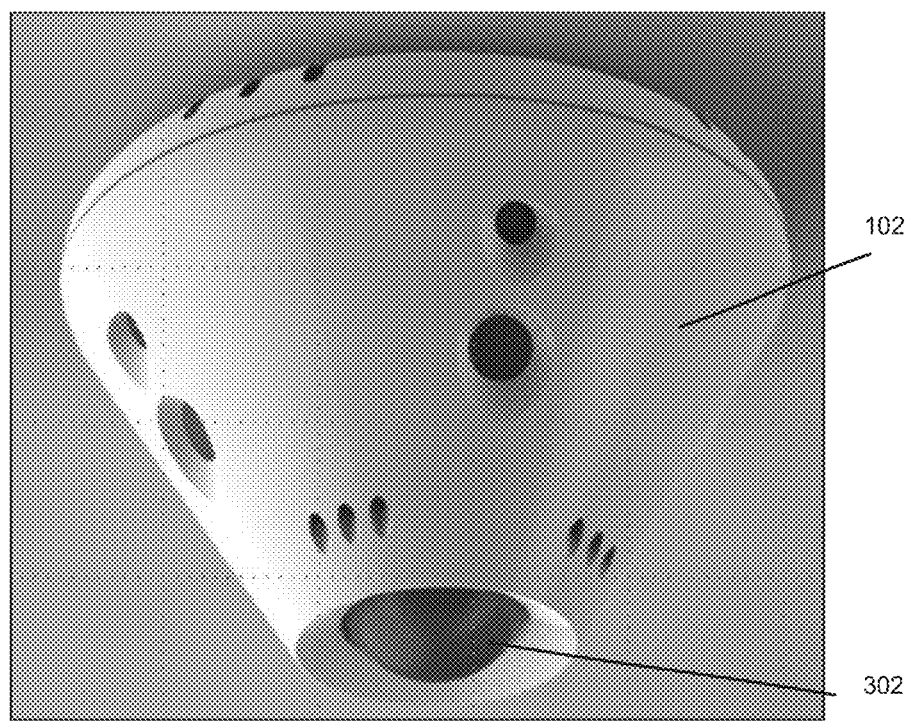
FIG. 3 illustrates a perspective view of an example sensor hub, in accordance with some embodiments.

FIG. 3 illustrates a perspective view of an example sensor hub, in accordance with some embodiments. As shown, the sensor hub 102 may be attached (e.g., affixed) to a fixture, such as a light emitting diode (LED) tube light 302, or directly to a wall or a ceiling of an area of the environment. The body 104 of the sensor hub 102 may have a substantially conical shape, to provide for desired spatial sensor response to ambient conditions of the environment.

Figure 4:
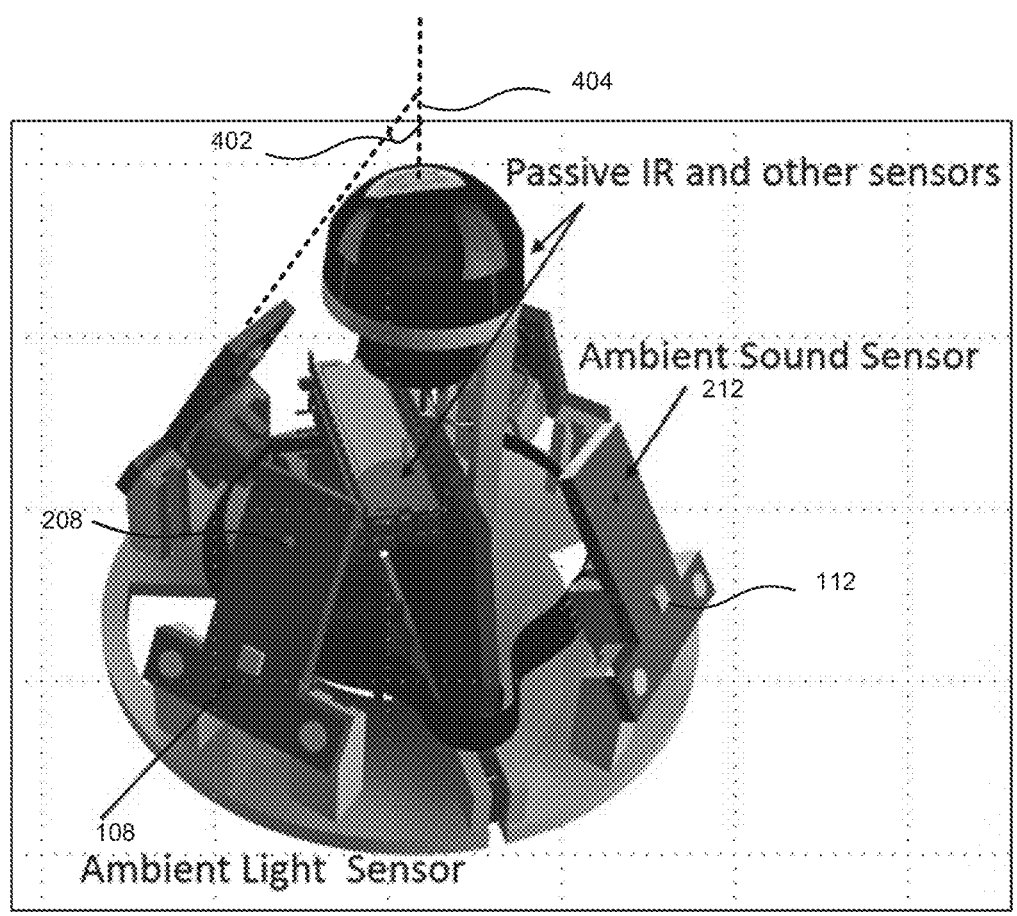
FIG. 4 illustrates a perspective view of an example internal configuration of the sensor hub of FIGS. 1-3, in accordance with some embodiments.

FIG. 4 illustrates a perspective view of an example internal configuration of the sensor hub of FIGS. 1-3, in accordance with some embodiments. As shown, the ALS (108, 112 and two more ALS not visible in this view) may be disposed substantially orthogonally to each other, to provide for desired sensing of ambient light from various directions. The ASS (208, 212, and two more ASS not visible in this view) may also be disposed substantially orthogonally to each other, to provide for desired sensing of ambient noise from various directions. Furthermore, the ALS and ASS may be disposed under an acute angle 402 (e.g., 45 degrees) relative to an imaginary vertical axis 404 of the sensor hub body. In general, the angle 402 may be selected to optimize respective spatial responses of the ASS and ALS to the respective types of ambient conditions (e.g., noise and light).

While the example configuration of the sensor hub includes four independent ALS and four ASS, placed orthogonally, it should be noted that in some embodiments the sensor hub configuration may include, for example, six ALS and six ASS, positioned substantially hexagonally. The sensor hub body may include respective apertures for six ALS and six ASS. More generally, the number of ALS and/or ASS sensors disposed in the sensor hub may vary (e.g., four or more), and the sensors of the same type (e.g., ALS or ASS) may be disposed at equal distances to each other within the sensor hub. For example, the sensor hub configuration may include eight ALS and eight ASS, where sensors of each type may be positioned substantially octagonally to each other.

Figure 5:
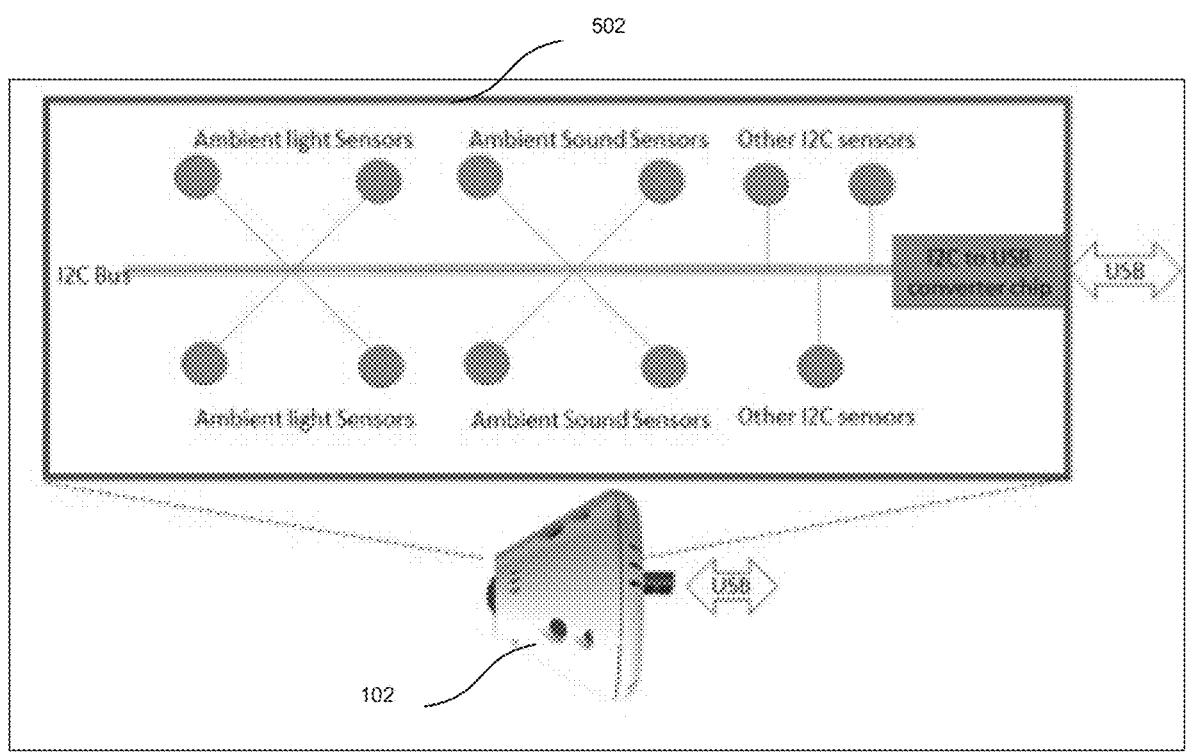
FIG. 5 is a schematic diagram illustrating an example sensor module of the sensor hub of FIGS. 1-4, in accordance with some embodiments.

FIG. 5 is a schematic diagram illustrating an example sensor module of the sensor hub of FIGS. 1-4, in accordance with some embodiments. As shown, the sensor module may be disposed on a sensor board 502 (e.g., PCB) inside the sensor hub 102 and include ALS, ASS, and other sensors as discussed above. The sensors may comprise inter-integrated circuit (I2C)-compatible sensors and may be connected to an I2C bus, as shown. The I2C bus may be coupled with a port (e.g., USB) via an I2C to USB converter.

Figure 6:
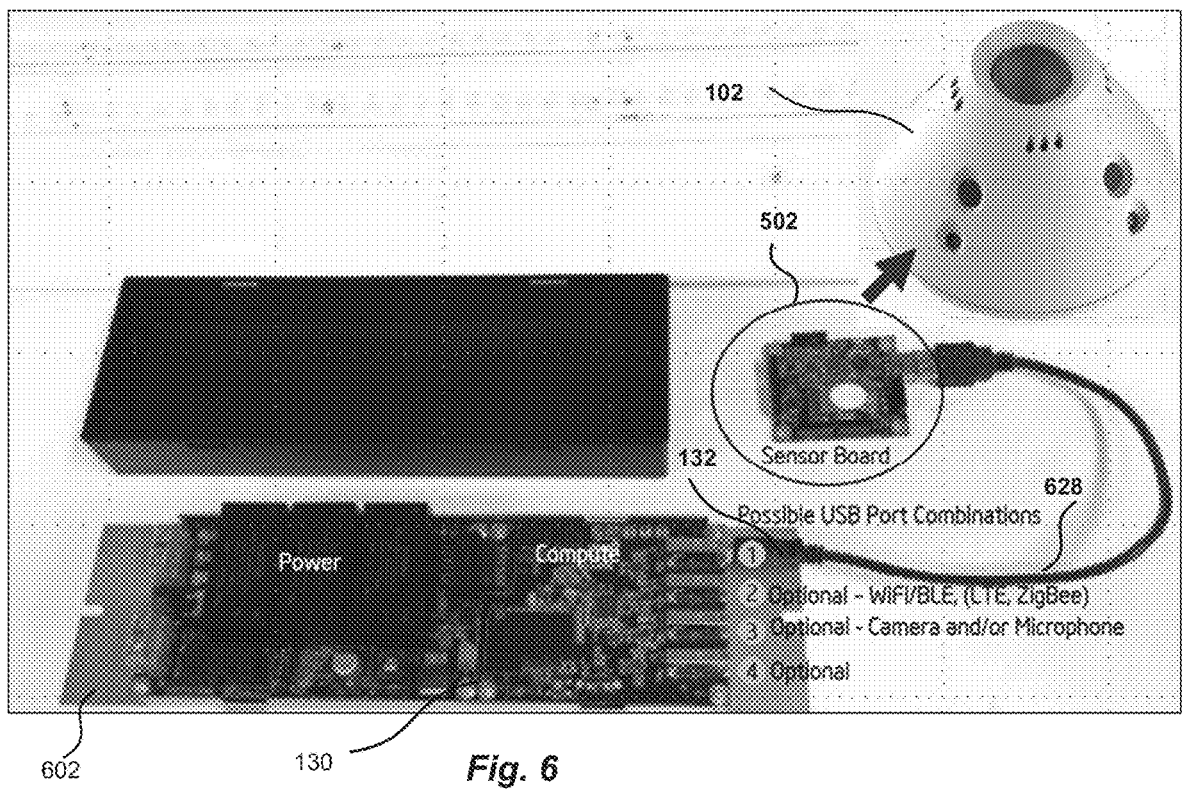
FIG. 6 is a view of an example connection of the sensor hub of FIGS. 1-5 to a processing block, in accordance with some embodiments.

FIG. 6 is a view of an example connection of the sensor hub of FIGS. 1-5 to a processing block, in accordance with some embodiments. As shown, the processing block 130 having a compute module and a power module may be implemented on a PCB 602. The processing block 130 may be coupled with the sensor board 502 via the communication interface cable 628 via a connector comprising communication interfaces 132. The possible communication interfaces 132 may include, but may not be limited to, USB, WiFi, Bluetooth low energy (BLE), Long-Term Evolution (LTE), ZigBee, camera and/or microphone connectors, and the like. The communication interfaces 132 may serve to transmit sensor data to an external recipient, e.g., an external computing device. In some embodiments, the processing block 130 may be combined with the control block 134, which may be disposed on the PCB 602.

In general, in various embodiments, the sensor hub 102 may be implemented in a compact form factor, such as an LED bulb. The sensor board 502 may be implemented on the same computing board as the processing block 130. In other embodiments, such an LED street light or LED tube light discussed in reference to FIG. 3, the sensor board 502 may be implemented on a separate module away from the computing board in a separate housing, and connected with the computing board (e.g., PCB 602) by a power and communication interface such as USB, as shown in FIG. 6.

In embodiments, the sensor hub may be used in (but not limited to) platforms other than environment (e.g., industrial or home environment discussed herein). For example, the sensor hub may be implemented in robots, drones, assisted or driverless cars, instruments, devices, industrial systems, security systems, security and surveillance systems, building management systems, etc.

As discussed, the respective position of the ambient light sensors in the sensor hub makes it possible to capture ambient light from multiple directions. In embodiments, ambient light data may be captured from multiple sensors at a user specified period of time. The described embodiments may provide for synchronized capture of light sensor data from a set of multiple, heterogeneous sensors or sensor hubs disposed in the environment.

For example, ambient light in an area (e.g., a room) may be estimated using readings from each ambient light sensor and using a certain formula (e.g., could be average) to arrive at a value that may represent the luminosity level of the area. Knowing such a value has many applications. For example, when the luminosity level of a room is set at a prescribed level and assuming the room has windows, when the sunlight (daylight) starts entering from the window and starts adding luminosity, the external light source (e.g., electric bulb) may be dimmed to compensate for the sunlight, resulting in energy savings. In other words, an internally controlled lighting may dynamically maintain a specified luminosity.

In another example, in a hospital operation theater, a surgeon may be performing a surgery and the shadows created by heads could be compensated by adjusting lights from a plethora of light sources to maintain a certain level of luminosity over the area being operated.

In yet another example, if one of the ambient lighting sensors present in the environment is damaged and cannot function, the control of the luminosity may not be compromised in that specific area, because the remaining sensors may compensate for the damaged one, so that the ambient light sensing function of the sensor hub may remain operational.

Similarly, a relative position of the audio sensors in the sensor hub makes it possible to capture audio intensity of the surroundings and to identify a direction from which the sound is coming.

For example, in many conference rooms, if one is sitting still, one may need to provide some motion (e.g., wave hands) to get the light turned on. Using the sensor hub described herein, detected audio background may indicate human presence even when the person is sitting still and no motion may be detected. Accordingly, the lights in the conference room may stay on even in the absence of detected motion.

In another example, the ASS disposed in the sensor hub as described herein may help detect where a certain audio is coming from. This may be useful, for example, in industrial setting, to detect abnormal sound. In another example, the direction of a gunshot may be identified. In yet another example, a person's location (e.g., a location of a student in a large classroom) may be identified depending on where the sound is coming from. In yet another example, in an audio conference room, the location of participants at the table may be identified.

In some embodiments, understanding the direction of the speech or audio recording may be beneficial. In some embodiments, where a certain level of white noise is expected and when there is not enough white noise, a white sound generator may be triggered. This is based on the assumption that human beings tend to be more productive when there is a certain level of background noise.

In embodiments, ambient sound sensors may be placed one in each zone or area that may be controlled independently. The sound intensity may be different depending on the direction the sensor may be pointing. Placing at least four ambient sound sensors in each direction may provide for identification of a location of the sound source. Furthermore, certain functions, such as whether to keep a light on in a conference room, may be defined by motion (e.g., passive IR) sensor as well as sound sensor. Having four ambient sound sensors placed this way makes sure that sound is picked up; even when one of the ASS is damaged or even if the person in a room is placed at one end of the room, that sound is still picked up, ensuring the presence is detected.

In embodiments, incorporation of multiple ALS and/or ASS with signal multiplexing may provide for ALS or ASS failure detection. For example, in case of a sensor failure, the multiplexed sensor values may be corrupted. Such condition may be interpreted as a failure of one or more ALS or ASS. In another example, readings acquired from multiple ALS or ASS, having values drastically disparate from one another, beyond a certain threshold, may serve as indication of light pathway blockage or incorrect positioning of the sensor hub in relation to a desired (from sensing perspective) placement in the environment. Some of the above examples of sensor hub operation are described in reference to FIGS. 7-11 in greater detail.

In summary, the embodiments described herein provide a method to aggregate the multiple ALS and/or ASS to determine the position of the natural light or audio and detect the luminosity of artificial lighting, intensity of the white noise, or audio background. The data from the ALS or ASS may be sent to a back end system over standard data interfaces such as WiFi, ZigBee, and Bluetooth or through USB. The data may be analyzed in the sensor hub by a processor, or by a computing board to which USB is connected, or by a gateway on the premises or in the cloud. Data from ambient light sensors may be collected and used in conjunction with developed algorithms to determine whether ambient light sensors have gone bad, whether reconfiguration, orientation, and placement of the sensors or sensor hubs may be required, or luminosity of the interior lights may be adjusted. The data from the ambient conditions may be used in conjunction with a white noise generator, as described above. The processing of readings from the ALS and the ASS may be done in a similar or same manner.

Multiple ALS or ASS readings may be factored together and thereby represent an averaged 360 degree view of the ambient light outside the sensor hub. The resulting sensor reading may provide a finer resolution, compared with readings provided by individual sensors. The resulting reading may further provide a realistic picture of the ambient light and/or sound in the environment due to particular spatial arrangement (e.g., orthogonal disposition) of the ambient light sensors in the hub. These readings may provide the ability to fine-tune levels of the light, e.g., for daylight adjustment, or fine-tune the location of the sound or the decibel level (intensity) of the sound.

Figure 7:
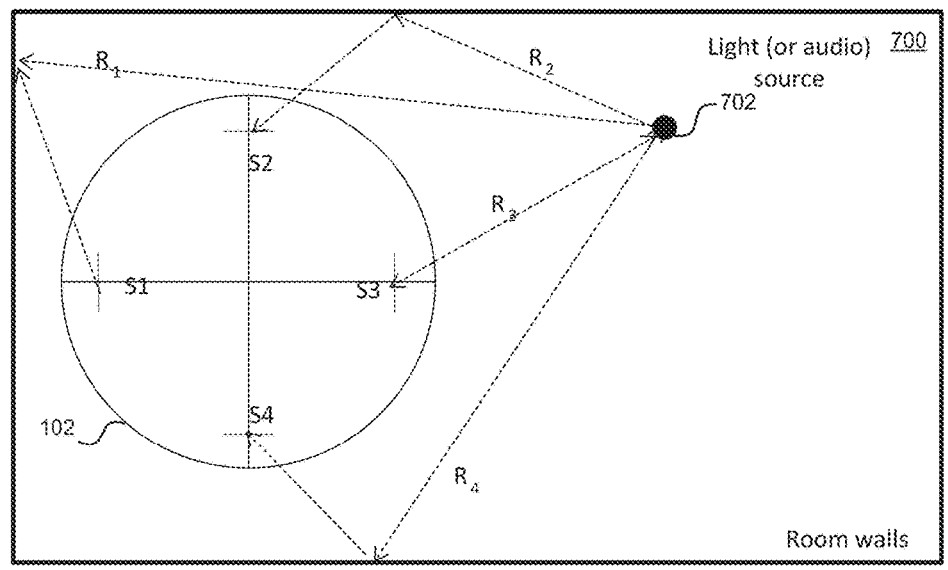
FIG. 7 is a diagram illustrating an example spatial disposition of sensors in the sensor hub disposed in an environment, to provide ambient condition parameters, in accordance with some embodiments.
Figure 7:
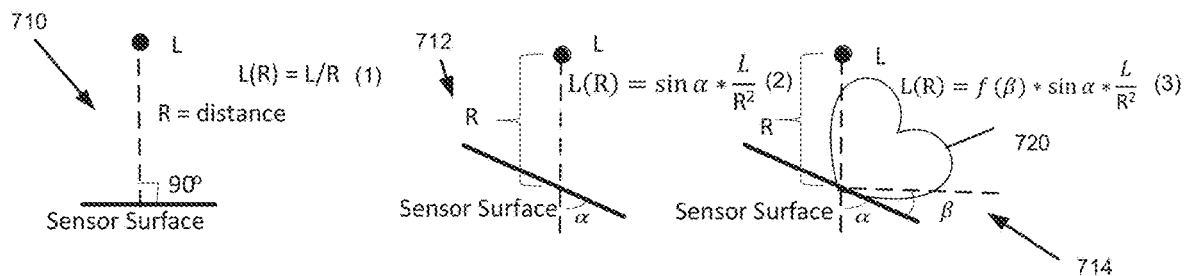

FIG. 7 is a diagram illustrating an example spatial disposition of sensors in the sensor hub disposed in an environment, to provide ambient condition parameters, in accordance with some embodiments. The following discussion applies to the source 702 being a light (visible or UVA or UVB, infrared or similar) source or audio/voice source. Accordingly, the term "luminance" as used herein may also indicate "audio intensity." The ambient condition parameters may include luminance in the environment 700 including a light source 702 or audio level provided by an audio source 702. Accordingly, L is the luminance (or audio level) at the source 702. L(R) is the luminosity at a total distance (path) R between the source 702 and a respective sensor, such that:

$L_1(R_1)$=luminance at sensor S1 of the sensor hub 102, $L_2(R_2)$=luminance at sensor S2 of the sensor hub 102, $L_3(R_3)$=luminance at sensor S3 of the sensor hub 102, and $L_4(R_4)$=luminance at sensor S4 of the sensor hub 102. It is understood that R may not be one path but may be multiple paths. Effective luminance may then be described as:

$$L_e = G[L_1(R_1), L_2(R_2), L_3(R_3), L_4(R_4)].$$

G denotes a function that may be empirically adjusted to the types of sensors, room characteristics such as reflectance, location of the sensor hub in the room, type of light source, temperature of the light. For example, a non-weighted average of $L_1(R_1)$, $L_2(R_2)$, $L_3(R_3)$, and $L_4(R_4)$ may provide for effective luminance $L_e = 1/4*[L_1(R_1)+L_2(R_2)+L_3(R_3)+L_4(R_4)]$.

Equations governing the above calculation of effective luminance (audio intensity) are shown in views 710, 712, and 714 of FIG. 7. As shown, at different angles of a sensor S surface to path R between the source (e.g., light source L) and the sensor S, luminance L may be calculated according to the equations (1), (2), and (3) provided in respective views 710, 712, and 714. The curve 720 in view 714 provides an example of characteristic spatial response curve of a sensor. Every sensor has a response characteristic that is different. The corresponding function is denoted as $f(\beta)$. View 710 assumes the sensor sensing surface is perpendicular to the incident light and the spatial response curve is uniform (e.g., half circle, not shown). View 712 assumes the sensor sensing surface is at an angle and also assumes the spatial response curve is uniform (half circle but not shown). View 714 assumes the sensor sensing surface is at an angle but with a non-uniform spatial response curve denoted by 720.

Figure 8:
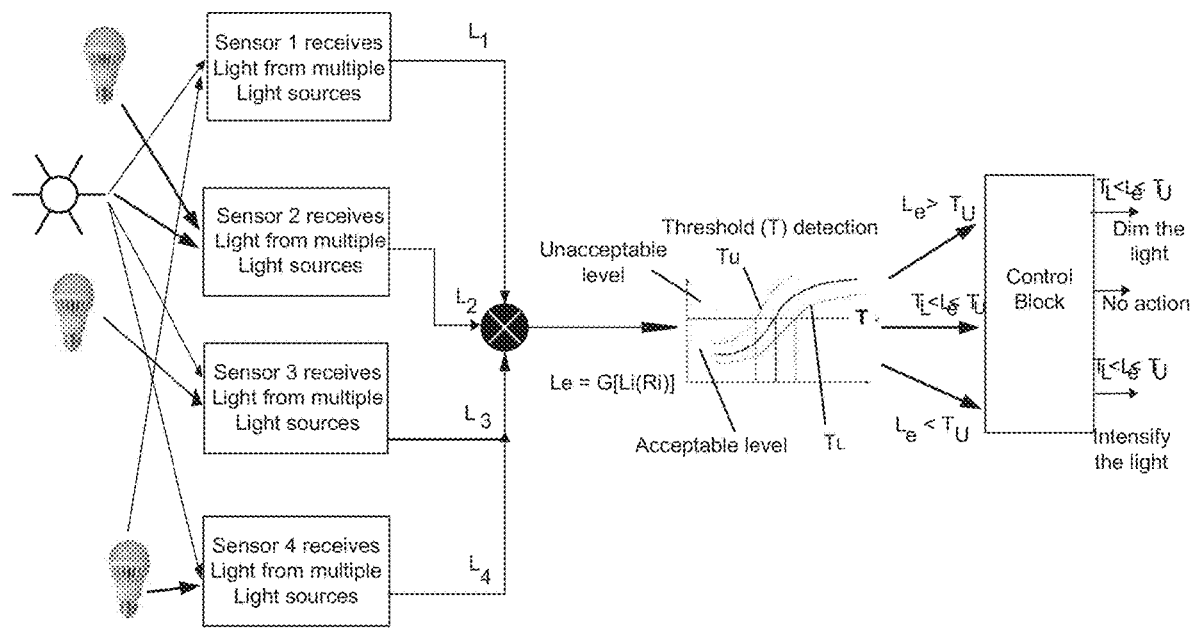
FIG. 8 is a process flow diagram illustrating an example operation of a sensor hub in an environment, in accordance with some embodiments.

FIG. 8 is a process flow diagram illustrating an example operation of a sensor hub in an environment, in accordance with some embodiments. The process of FIG. 8 may be performed by the processing block 130 of FIG. 1 in response to execution of instructions provided in accordance with calculations described in reference to FIG. 7. The process flow of FIG. 8 may be applicable to light and audio sensors (ALS and ASS) and may be used in light intensity or audio intensity calculations.

As shown, the sensors 1, 2, 3, and 4 of the sensor hub 102 disposed, e.g., in the environment 700 of FIG. 7 may receive light from multiple light sources, including natural light sources (window, sun, etc.) and/or artificial light sources (e.g., multiple light bulbs disposed in the environment as shown).

Luminance L at each sensor may be read and effective luminance $L_e$ may be calculated as described in reference to FIG. 7. The calculated value of effective luminance (audio intensity) may be checked against acceptable threshold values. Light and audio intensity threshold (e.g., upper and lower thresholds Tu and $T_L$ may be pre-set or detected depending on the sensor parameters and ambient conditions of the environment in which the sensor hub is disposed. Acceptable levels may be the sensor readings that are between the upper threshold and lower threshold. Any sensor reading that is greater than the upper threshold or smaller than the lower threshold may be considered as an unacceptable level. The upper and lower thresholds may be set differently for different environments, and T shows an example value that is in between upper and lower thresholds for a given time, or environment. For example, the thresholds set during the day and night could be different or could be set differently for different people or environments. For example, the audio threshold may be different for office and a cafeteria. The vertical axis denotes the threshold value while the horizontal axis may denote time, environment, people or situations. Furthermore, the upper and lower control thresholds may represent a continuous variable if the horizontal axis is continuous, e.g., time. The upper and lower thresholds may be discrete and discontinuous if the horizontal axis denotes specific cases, such as office, conference rooms, or cafeteria. These thresholds may be manually set by situations, environments or time, or a person. In some embodiments, the threshold values may be learned by the system and changed automatically, e.g., using a learning algorithm.

The results of comparison of effective luminance (audio intensity) value with upper and lower thresholds may be provided to a control block (e.g., 134 of FIG. 1). If the luminance is determined to be within the threshold "corridor," no action may be taken by the control block 134. If the luminance is determined to be above the upper limit or below the lower limit, the control block may be caused to respectively dim or increase the lights in the environment (e.g., light source 702 in the environment 700), to bring the luminance within acceptable limits. Similar actions may be undertaken with respect to changing audio levels of audio sources present in the environment 700.

Figure 9:
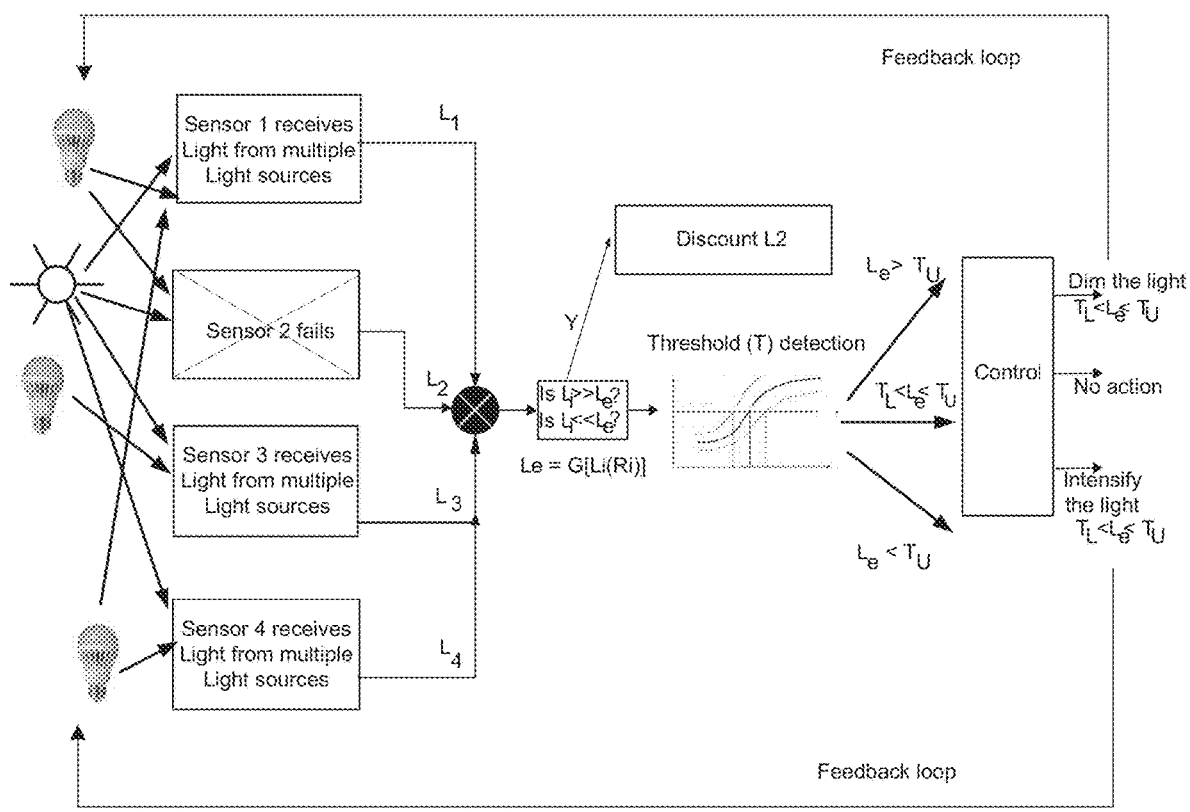
FIG. 9 is a process flow diagram illustrating another example of operation of a sensor hub in an environment, in accordance with some embodiments.

FIG. 9 is a process flow diagram illustrating another example of operation of a sensor hub in an environment, in accordance with some embodiments. The process of FIG. 9 may be performed by the processing block 130 of FIG. 1 in response to execution of instructions provided in accordance with calculations described in reference to FIG. 7. The process flow of FIG. 9 may be applicable to light and audio sensors (ALS and ASS) and may be used in light intensity or audio intensity calculations.

As shown, the sensors 1, 2, 3, and 4 of the sensor hub 102 disposed, e.g., in the environment 700 of FIG. 7 may receive light from multiple light sources, including natural light sources (window, sun, etc.) and/or artificial light sources (e.g., multiple light bulbs disposed in the environment as shown).

Luminance L at each sensor may be read and effective luminance $L_e$ may be calculated as described in reference to FIGS. 7 and 8. It may be checked whether luminance provided by each sensor is above or below the expected luminance Le. To do that, it is initially assumed that all the sensors are fully functional and that a value of Le is noted. Normally, the values from all four sensors 1-4 (L1-L4) may be in the same neighborhood as Le. At some stage, the sensor 2 may be assumed to become non-functional. As a result, the value of Le may then deviate substantially from the value of each sensor. If a given sensor value is off, a conclusion may be made that the specific sensor has become nonfunctional and is discounted from the further calculations. In other words, the Le may be calculated based on G(L) without the specific non-operational sensor-provided data. In this case, luminance of each sensor may be checked to determine whether it is beyond the expected value of Le. This may be done before the threshold algorithms may be used to eliminate the non-functional sensor. If the luminance value of at least one sensor is beyond expected limits, it may be assumed that one of the sensors (e.g., sensor 2) may have failed. The remaining process may proceed in accordance with the actions described in reference to FIG. 8.

Figure 10:
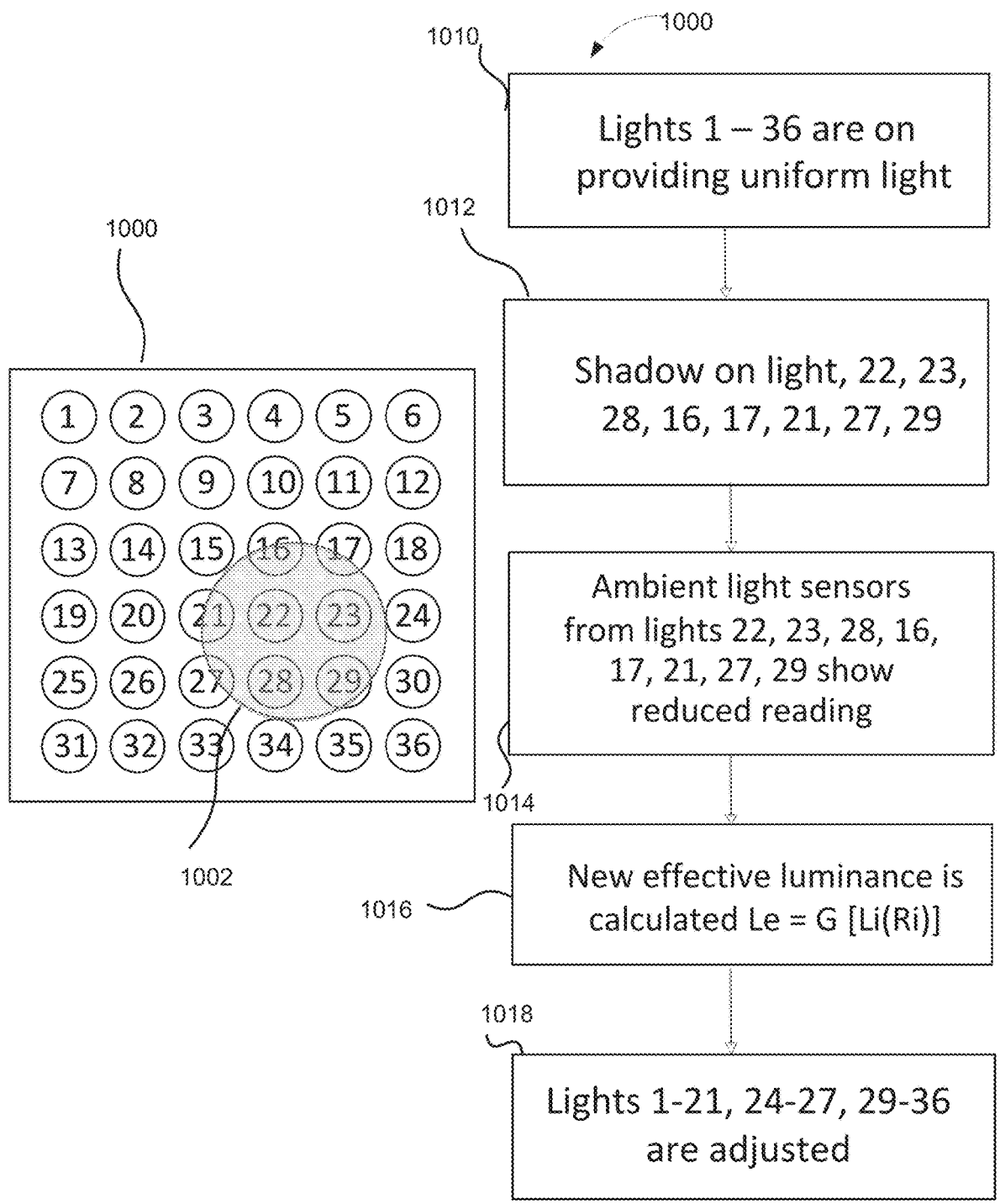
FIG. 10 is a process flow diagram illustrating another example of operation of a sensor hub in an environment, in accordance with some embodiments.

FIG. 10 is a process flow diagram illustrating another example of operation of a sensor hub in an environment, in accordance with some embodiments. More specifically, the process of FIG. 10 describes light control in an environment. The process 1000 may be performed by the processing block 130, alone or on combination with control block 134 coupled with the sensor hub 102 of FIG. 1.

It may be assumed that in an environment (conference room, operations theater, or the like) there may be multiple light sources, such as lights 1-36 that may provide substantially uniform light (e.g., light on the patient in the operation theater, as noted at block 1010 of the process 1000). It may be further assumed that the light coming from at least some lights may be partially or fully obscured. As indicated at block 1012, the light provided by lights 22, 23, 28, 16, 17, 21, 27, and 29 may be occluded by shadow 1002. For example, a surgeon may bend over the patient and cast the shadow 1002 over light provided by lights 22, 23, 28, including a partial shadow over light provided by lights 16, 17, 21, 27, and 29. Accordingly, ambient light sensors disposed in the sensor hub (not shown) in the environment 1000 may show reduced readings from lights 22, 23, 28, 16, 17, 21, 27, and 29, as indicated at block 1014. At block 1016, new effective luminance may be calculated:

Le=G[Li(Ri)]. At block 1018, the light intensities of unobscured lights 1-21, 24-27, 29-36 may be adjusted to compensate for the obscured lights to provide $T_L < L_e < T_U$, as described in reference to FIG. 9.

Figure 11:
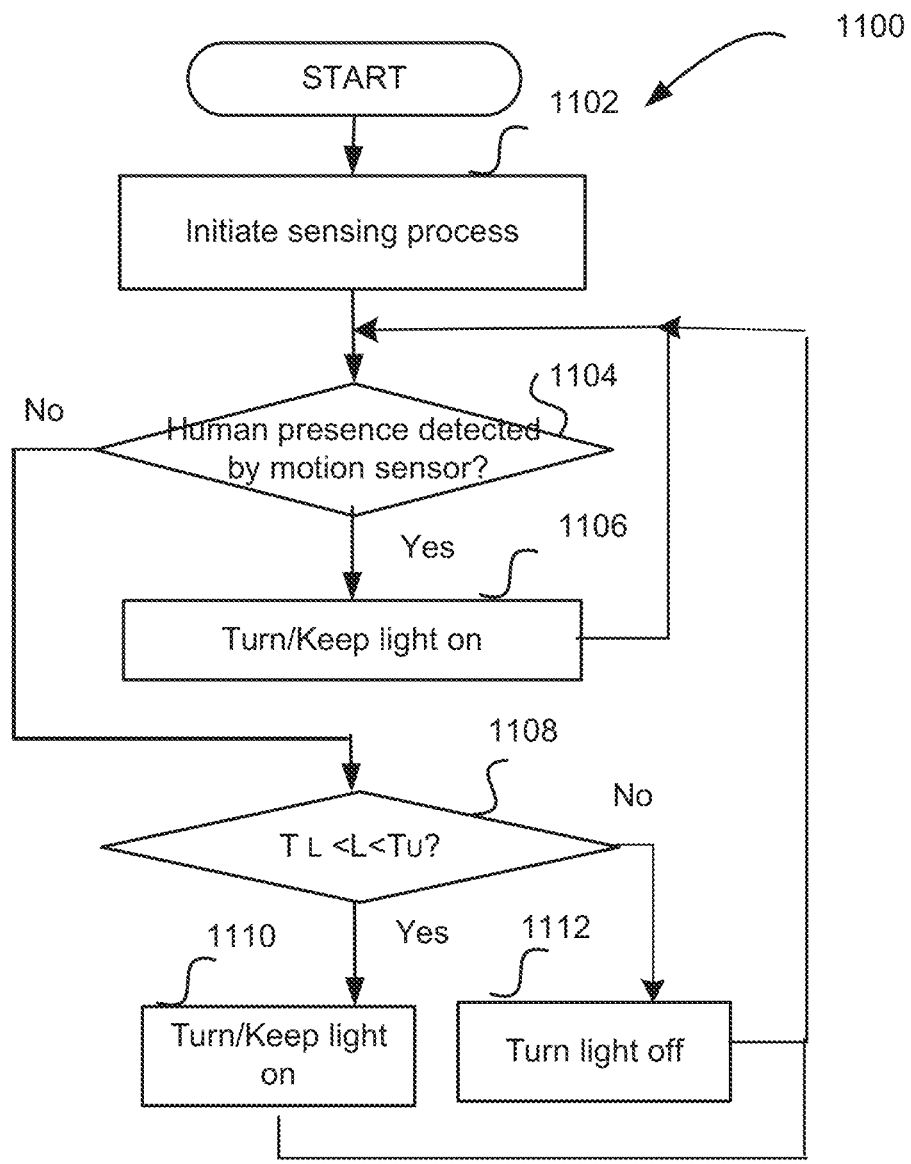
FIG. 11 is a process flow diagram illustrating another example of operation of a sensor hub in an environment, in accordance with some embodiments.

FIG. 11 is a process flow diagram illustrating another example of operation of a sensor hub in an environment, in accordance with some embodiments. More specifically, the process 1100 describes human presence detection in an environment, such a conference room or a classroom, for example. The process 1100 may be performed by the processing block 130, alone or on combination with control block 134 coupled with the sensor hub 102 of FIG. 1. As discussed above, the sensor hub 102 may include multiple ASS, ALS, as well as at least a motion sensor (e.g., passive IR sensor).

The process 1100 may begin at block 1102, and include initiating the sensing process by the sensors of the sensor hub.

At decision block 1104, the process 1100 may include determining whether the human presence has been detected by the motion sensor of the sensor hub. If such presence has been detected, at block 1106 the lights in the environment may be caused to turn on or kept on if they had been turned on.

Thereafter, if human presence has not been detected (e.g., if the person is sitting still and not moving, the motion sensor may not detect human presence with motion sensor), at decision block 1108 the readings of the ASS of the sensor hub may be checked to determine whether the sound intensity (noise) level in the environment is within the established limits. The ASS may be checked in a loop, e.g., each check may occur over a regular time interval (polled) to determine whether the sound level may indicate the human presence. In other words, initially, human presence may be detected via motion. If human presence may not be detected via motion, there is a possibility that a person or persons are in the environment, but may be motionless. Accordingly, noise level may be checked to discover human presence.

If the noise level is determined to be higher than the lower threshold limit, at block 1110 the lights may be kept on or turned on. If the noise level is determined to be lower than the lower threshold, at block 1112 the lights may be turned off. In other words, at block 1106 the lights may be turned on using motion sensor readings, and then as long as someone is talking in the room, ASS may provide the trigger to keep the light on even if there is no motion.

Once the light is turned on or remains on with block 1106 or 1110, the ALS controls the behavior of the lights as previously described by FIGS. 7-10.

Figure 12:
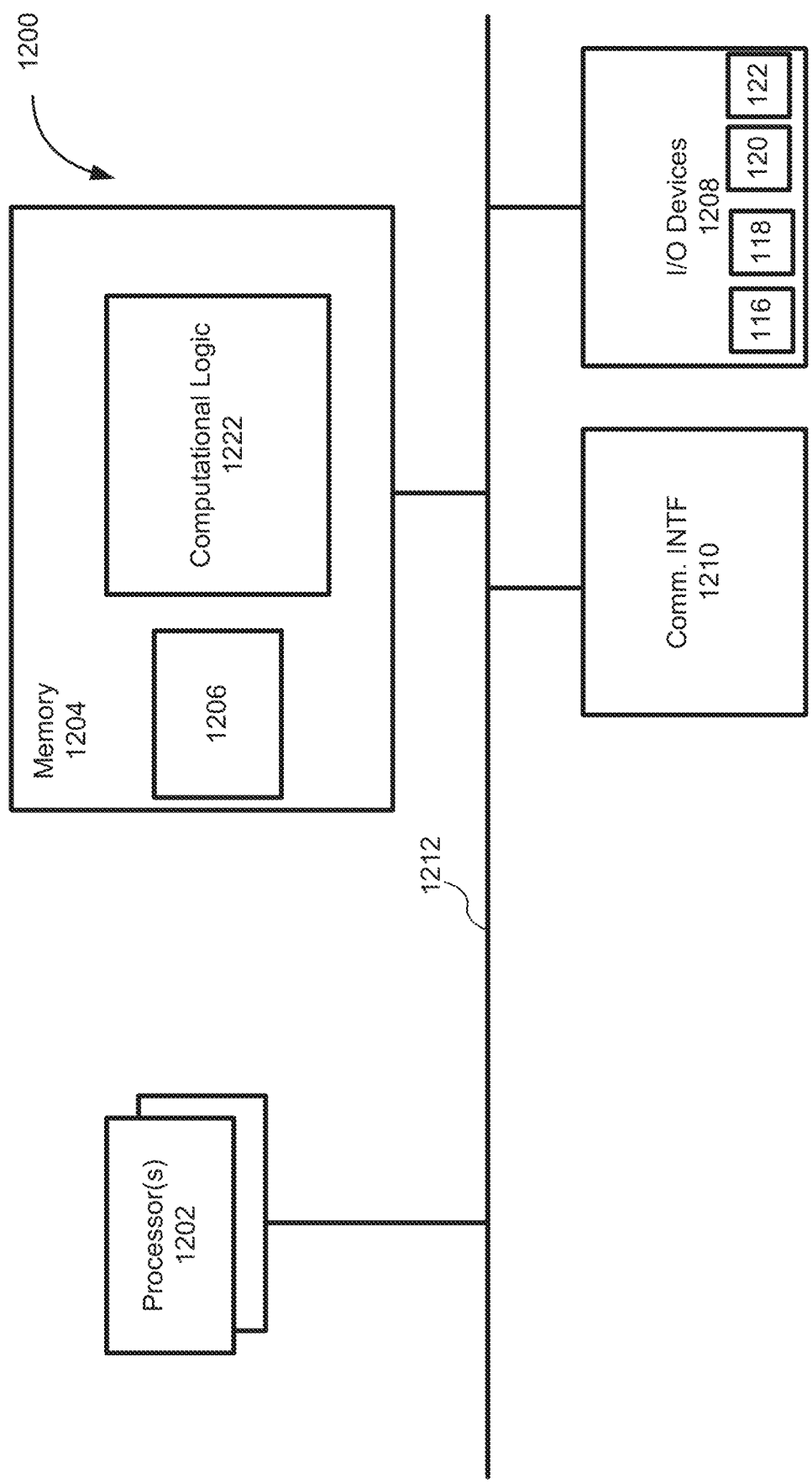
FIG. 12 illustrates an example computing device suitable for use to practice aspects of the present disclosure, in accordance with various embodiments.

FIG. 12 illustrates an example computer device suitable for use to practice aspects of the present disclosure, in accordance with various embodiments. More specifically, the block diagram of FIG. 12 may represent an example architecture of the sensor hub 102, alone or in combination with control block 134 of FIG. 1, in accordance with various embodiments. As shown, computer device 1200 may include one or more processors 1202, each having one or more processor cores, and persistent memory 1204. The processor 1202 may include any type of processors. The processor 1202 may be implemented as an integrated circuit having multi-cores, e.g., a multi-core microprocessor.

In general, system memory 1204 may include copies of programming instructions configured to perform operations related to the sensor hub 102, for example, processing of the various sensor data, collectively denoted as computational logic 1222.

The computer device 1200 may further include input/output (I/O) devices 1208 and communication interfaces 1210 (such as network interface cards, infrared receivers, radio receivers (e.g., Near Field Communication (NFC), Bluetooth, WiFi, 3G/4G/5G Long-Term Evolution (LTE) or future generations), and so forth). In some embodiments, the I/O devices may include sensors, such as sensors 116, 118, 120, and 122, as described in reference to FIG. 1, and other sensors described in reference to FIGS. 2-7.

The communication interfaces 1210 may include communication chips (not shown) that may be configured to operate the device 1200 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1210 may operate in accordance with other wireless protocols in other embodiments.

The above-described computer device 1200 elements may be coupled to each other via system bus 1212, which may represent one or more buses, e.g., I2C bus described in reference to FIG. 5. In the case of multiple buses, they may be bridged by one or more bus bridges (not shown). Each of these elements may perform its conventional functions known in the art. The programming instructions implementing the operations associated with the sensor hub 102 of FIG. 1, e.g., processing the sensor data may be implemented by assembler instructions supported by processor(s) 1202 or high-level languages that may be compiled into such instructions.

The permanent copy of the programming instructions of computational logic 1222 may be placed into permanent storage devices 1206 in the factory, or in the field, through, for example, a distribution medium (not shown), such as a compact disc (CD), or through communication interfaces 1210 (from a distribution server (not shown)). That is, one or more non-transitory distribution media having an implementation of the agent program may be employed to distribute the agent and to program various computing devices. In embodiments, the distribution media may be transitory, e.g., signals encoded with the instructions.

The number, capability, and/or capacity of the elements 1208, 1210, 1212 may vary. Their constitutions are otherwise known, and accordingly will not be further described.

At least one of processors 1202 may be packaged together with memory having computational logic 1222 configured to practice aspects of embodiments described in reference to FIGS. 7-11. For one embodiment, at least one of processors 1202 may be packaged together with memory having computational logic 1222 to form a System in Package (SiP) or a System on Chip (SoC). For at least one embodiment, the SoC may be utilized to form the control block 134 of FIG. 1. In various implementations, the computing device 1200 may comprise any electronic device that processes data and that utilizes readings provided by the sensors 116, 118, 120, and 122 of FIG. 1.

Example 1 may be a sensor hub for sensing ambient conditions, comprising: a body of the sensor hub, wherein the sensor hub body may include a plurality of apertures disposed on the sensor hub body at substantially equal distances to each other, oriented towards a plurality of directions; a plurality of sensors of a plurality of types disposed inside the sensor hub body to interface respective apertures, and to sense ambient conditions in the plurality of directions via the apertures; and one or more communication interfaces coupled to the plurality of sensors, and disposed with the sensor hub, to transmit the sensor data or results of processing sensor data to an external recipient.

Example 2 may include the subject matter of Example 1, wherein the plurality of apertures and sensors may be symmetrically disposed.

Example 3 may include the subject matter of Example 2, wherein the plurality of apertures may comprise at least four apertures disposed substantially orthogonally to each other and oriented towards four mutually orthogonal directions, and wherein the plurality of sensors may comprise at least four sensors correspondingly disposed substantially orthogonally to each other.

Example 4 may include the subject matter of Example 1, wherein the plurality of apertures may comprise at least six apertures disposed substantially hexagonally to each other, oriented towards six directions, and the plurality of sensors may comprise at least six sensors correspondingly disposed substantially hexagonally to each other.

Example 5 may include the subject matter of Example 1, wherein the plurality of apertures may comprise a plurality of apertures of a first type, and a plurality of apertures of a second type, oriented respectively towards the plurality of directions; and wherein the plurality of sensors may include a plurality of ambient light sensors to sense ambient light, respectively disposed to interface respective apertures of the plurality of apertures of the first type, and a plurality of ambient sound sensors to sense ambient audio condition, respectively disposed to interface respective apertures of the plurality of apertures of the second type.

Example 6 may include the subject matter of Example 5, wherein the plurality of apertures of the first type and the plurality of apertures of the second type may be respectively disposed proximal to each other, and wherein the plurality of ambient light sensors, and the plurality of ambient sound sensors may be respectively disposed proximal to each other.

Example 7 may include the subject matter of Example 5, wherein the plurality of ambient light and sounds sensors may be disposed inside the sensor hub body under an acute angle relative to a vertical axis of the sensor hub body, wherein the acute angle may be selected to optimize respective spatial responses of the ambient light and ambient sound sensors to the ambient light and audio conditions.

Example 8 may include the subject matter of Example 5, wherein the sensor hub further may include one or more other sensors, disposed inside or on the sensor hub body to sense other ambient conditions, in addition to the ambient light and audio conditions, wherein the one or more other sensors may include at least one of: a passive infrared (PIR) or motion sensor, a temperature sensor, or an energy sensor.

Example 9 may include the subject matter of Example 1, wherein the ambient conditions may include ambient light conditions, wherein the sensor hub is disposed in an environment, wherein the sensor hub may be coupled via the one or more communication interfaces with a processor to receive and process sensor data, wherein to receive and process sensor data may include to identify the ambient light conditions based on the received sensor data, and to cause at least one external light source disposed in the environment to adjust light intensity, based at least in part on the identified ambient light conditions.

Example 10 may include the subject matter of Example 9, wherein the ambient conditions further may include ambient audio conditions, wherein the processor to receive and process sensor data further may include to identify the ambient audio conditions based on the received sensor data, wherein to cause at least one external light source to adjust light intensity may be further based on the identified ambient audio conditions.

Example 11 may include the subject matter of Example 1, wherein the ambient conditions may include ambient audio conditions, wherein the sensor hub may be disposed in an environment, wherein the sensor hub may be coupled via the one or more communication interfaces with a processor to receive and process sensor data, wherein the processor to receive and process sensor data may include to identify the ambient audio conditions based on the received sensor data, and to cause an external sound source to adjust sound volume based at least in part on the identified ambient audio conditions.

Example 12 may include the subject matter of Example 1, wherein the sensor hub may be disposed in an environment, wherein the sensor hub may be coupled via the one or more communication interfaces with a processor to receive and process sensor data, wherein to receive and process sensor data may include to identify a faulty one of the sensors, and to adjust the processing of the received sensor data, to exclude data provided by the faulty sensor from the processing.

Example 13 may include the subject matter of any one of Examples 1-12, wherein the sensor hub body may comprise a substantially conical shape having a base attachable to an external surface, wherein the external surface may comprise one of: a ceiling or a wall of a facility, or a fixture attachable to the ceiling or the wall.

Example 14 may include the subject matter of Example 13, further comprising a processor coupling the plurality of sensors to the one or more communication interfaces, disposed inside the sensor hub body, to receive and process the sensor data, wherein the one or more communication interfaces may be to transmit results of the processing to the external recipient.

Example 15 may be a method for collecting ambient conditions data, comprising: initiating, by a processor coupled with or embedded inside a sensor hub including a plurality of apertures disposed on a sensor hub body at substantially equal distances to each other, and a plurality of sensors of a plurality of types disposed inside the sensor hub body to interface respective apertures, sensing of ambient conditions by the sensors via respective apertures; processing, by the processor, data indicative of the sensed ambient conditions; and causing, by the processor, a selective transmission of the processed data to an external recipient.

Example 16 may include the subject matter of Example 15, wherein the plurality of apertures comprise a plurality of apertures of a first type, and a plurality of apertures of a second type, oriented respectively towards a plurality of directions; and wherein the plurality of sensors may include a plurality of ambient light sensors to sense ambient light, respectively disposed to interface respective apertures of the plurality of apertures of the first type, and a plurality of ambient sound sensors to sense ambient audio conditions, respectively disposed to interface respective apertures of the plurality of apertures of the second type, wherein initiating the sensing of ambient conditions may include: causing, by the processor, the ambient light sensors to sense ambient light conditions via respective apertures of the first type; and causing, by the processor, the ambient sounds sensors to sense ambient audio conditions via respective apertures of the second type.

Example 17 may include the subject matter of Example 16, wherein the sensor hub is disposed in an environment, wherein processing the ambient conditions data may include: identifying, by the processor, the light conditions based on the received ambient conditions data; and causing, by the processor, at least one external light source disposed in the environment to adjust light intensity, based at least in part on the identified light conditions.

Example 18 may include the subject matter of Example 16, wherein the sensor hub is disposed in an environment, wherein processing the ambient conditions data may include: identifying, by the processor, the audio conditions based on the received ambient conditions data; and causing, by the processor, at least one external sound source disposed in the environment to adjust sound volume, based at least in part on the identified audio conditions.

Example 19 may include the subject matter of any one of Examples 15-18, wherein processing the ambient conditions data further may include identifying, by the processor, a faulty sensor among the sensors, and adjusting, by the processor, the processing of the ambient conditions data, to exclude data provided by the faulty sensor from the processing.

Example 20 may include one or more non-transitory processor-readable media having instructions stored thereon that, in response to execution on a processor coupled with or embedded inside a sensor hub including plurality of apertures disposed on a sensor hub body at substantially equal distances to each other, and a plurality of sensors of a plurality of types disposed inside the sensor hub body to interface respective apertures, cause the processor to: initiate sensing of ambient conditions by the sensors via respective apertures; process data indicative of the sensed ambient conditions; and cause a selective transmission of the processed data to an external recipient for further processing.

Example 21 may include the subject matter of Example 20, wherein the plurality of apertures may comprise a plurality of apertures of a first type, and a plurality of apertures of a second type, oriented respectively towards a plurality of directions; and wherein the plurality of sensors may include a plurality of ambient light sensors to sense ambient light, respectively disposed to interface respective apertures of the plurality of apertures of the first type, and a plurality of ambient sound sensors to sense ambient audio condition, respectively disposed to interface respective apertures of the plurality of apertures of the second type, wherein the instructions to initiate the sensing of ambient conditions may further cause the processor to initiate the ambient light sensors to sense ambient light conditions via respective apertures of the first type, and to initiate the ambient sounds sensors to sense ambient audio conditions via respective apertures of the second type.

Example 22 may include the subject matter of Example 21, wherein the sensor hub may be disposed in an environment, wherein the instructions to process the ambient conditions data may further cause the processor to identify the light conditions based on the received ambient conditions data; and cause at least one external light source disposed in the environment to adjust light intensity, based at least in part on the identified light conditions.

Example 23 may include the subject matter of Example 21 or 22, wherein the sensor hub may be disposed in an environment, wherein the instructions to process the ambient conditions data may further cause the processor to identify the audio conditions based on the received ambient conditions data; and cause at least one external sound source disposed in the environment to adjust sound volume, based at least in part on the identified audio conditions.

Example 24 may be an apparatus for collecting ambient conditions data, comprising: means, including a plurality of apertures disposed on a sensor hub body at substantially equal distances to each other, and a plurality of sensors of a plurality of types disposed inside the sensor hub body to interface respective apertures, for sensing ambient conditions; means for processing data indicative of the sensed ambient conditions; and means for selective transmitting the processed data to an external recipient.

Example 25 may include the subject matter of Example 24, wherein the plurality of apertures may comprise a plurality of apertures of a first type, and a plurality of apertures of a second type, oriented respectively towards a plurality of directions; and wherein the plurality of sensors may include a plurality of ambient light sensors to sense ambient light, respectively disposed to interface respective apertures of the plurality of apertures of the first type, and a plurality of ambient sound sensors to sense ambient audio condition, respectively disposed to interface respective apertures of the plurality of apertures of the second type, wherein sensing ambient conditions may include: the ambient light sensors sensing ambient light conditions via respective apertures of the first type; and the ambient sounds sensors sensing ambient audio conditions via respective apertures of the second type.

Example 26 may include the subject matter of Example 25, wherein the apparatus may be disposed in an environment, wherein means for processing the ambient conditions data may include: means for identifying the light conditions based on the received ambient conditions data; and means for causing at least one external light source disposed in the environment to adjust light intensity, based at least in part on the identified light conditions.

Example 27 may include the subject matter of Example 25, wherein the apparatus may be disposed in an environment, wherein means for processing the ambient conditions data may include: means for identifying the audio conditions based on the received ambient conditions data; and means for causing at least one external sound source disposed in the environment to adjust sound volume, based at least in part on the identified audio conditions.

Example 28 may include the subject matter of any one of Examples 24-27, wherein means for processing the ambient conditions data may further include means for identifying a faulty sensor among the sensors, and means for adjusting the processing of the ambient conditions data, to exclude data provided by the faulty sensor from the processing.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. A sensor hub for sensing ambient conditions, comprising:
   a three-dimensional (3D) body that comprises a substantially conical shape including a base attachable to an external surface disposed in an environment, and a body surface extending from the base to a top of the conically-shaped 3D body, wherein the 3D body further includes a plurality of apertures of a first type, and a plurality of apertures of a second type disposed on the surface of the 3D body,
   wherein a first aperture of the first type and a first aperture of the second type are substantially aligned on the surface of the 3D body to face a first direction;
   a second aperture of the first type and a second aperture of the second type are substantially aligned on the surface of the 3D body,. to face a second direction;
   a third aperture of the first type and a third aperture of the second type are substantially aligned on the surface of the 3D body to face a third direction; and
   a fourth aperture of the first type and a fourth aperture of the second type are substantially aligned on the surface of the 3D body to face a fourth direction,
   wherein the first and second directions are mutually orthogonal, the second and third directions are mutually orthogonal, the third and fourth directions are mutually orthogonal, and the fourth and first directions are mutually orthogonal, wherein the apertures of the first type are different from the apertures of the second type;
   at least first, second, third, and fourth ambient light sensors disposed inside the 3D body on a first plane that is located perpendicular to a vertical axis of the 3D body, wherein the vertical axis extends from a center of the base to a center of the top of the 3D body, wherein the first, second, third, and fourth ambient light sensors are provided to interface with, and to sense ambient light conditions via, the respective first, second, third, and fourth apertures of the first type;
   at least first, second, third, and fourth ambient sound sensors disposed inside the 3D body on a second plane that is located perpendicular to the vertical axis of the 3D body, and is spaced apart from the first plane, wherein the first, second, third, and fourth ambient sound sensors are provided to interface with, and to sense ambient audio conditions via, the respective first, second, third, and fourth apertures of the second type, wherein the ambient light and sounds sensors are disposed inside the 3D body under an acute angle relative to the vertical axis of the 3D body, wherein the acute angle is selected to optimize respective spatial responses of the ambient light and ambient sound sensors to the ambient light and audio conditions; and one or more communication interfaces coupled to the ambient light and ambient sound sensors, and disposed inside the 3D body, to transmit ambient light sensor data and ambient sound sensor data or results of processing of the ambient light sensor data and the ambient sound sensor data to an external recipient.

2. The sensor hub of claim 1, wherein the apertures and the sensors are symmetrically disposed.

3. The sensor hub of claim 1, wherein the sensor hub further includes one or more other sensors, disposed inside or on the 3D body to sense other ambient conditions, in addition to the ambient light and audio conditions, wherein the one or more other sensors include at least one of: a passive infrared (PIR) or motion sensor, a temperature sensor, or an energy sensor.

4. The sensor hub of claim 1, wherein the sensor hub is coupled via the one or more communication interfaces with a processor to receive and process the ambient light sensor data and the ambient sound sensor data, wherein to receive and process the ambient light sensor data and the ambient sound sensor data includes to identify the ambient light conditions based on the received ambient light sensor data, and to cause at least one external light source disposed in the environment to adjust light intensity, based at least in part on the identified ambient light conditions.

5. The sensor hub of claim 4, wherein the processor to receive and process the ambient light sensor data and the ambient sound sensor data further includes to identify the ambient audio conditions based on the received ambient sound sensor data, wherein to cause at least one external light source to adjust light intensity is further based on the identified ambient audio conditions.

6. The sensor hub of claim 1, wherein the sensor hub is coupled via the one or more communication interfaces with a processor to receive and process the ambient light sensor data and the ambient sound sensor data, wherein the processor to receive and process the ambient light sensor data and the ambient sound sensor data includes to identify the ambient audio conditions based on the received ambient sound sensor data, and to cause an external sound source to adjust sound volume based at least in part on the identified ambient audio conditions.

7. The sensor hub of claim 1, wherein the sensor hub is coupled via the one or more communication interfaces with a processor to receive and process the ambient light sensor data and the ambient sound sensor data, wherein to receive and process the ambient light sensor data and the ambient sound sensor data includes to identify a faulty one of the ambient light or ambient sound sensors, and to adjust the processing of the received ambient light sensor data and the ambient sound sensor data, to exclude data provided by the faulty sensor from the processing.

8. The sensor hub of claim 1, wherein the environment comprises a room or a facility, the external surface comprises one of: a ceiling or a wall of the environment, or a fixture attachable to the ceiling or the wall.

9. The sensor hub of claim 1, further comprising a processor coupled with the sensors and with the one or more communication interfaces, disposed inside the sensor hub body, to receive and process the ambient light sensor data and the ambient sound sensor data, wherein the one or more communication interfaces are to transmit results of the processing to the external recipient.

* * * * *